(12) United States Patent
Cole (10) Patent No.: US 9,037,334 B1
(45) Date of Patent: May 19, 2015

(54) ELECTRIC VEHICLE HAVING A DUAL BATTERY SYSTEM

(71) Applicant: Robert L. Cole, Kokomo, IN (US)

(72) Inventor: Robert L. Cole, Kokomo, IN (US)

( * ) Notice: Subject to any disclaimer, the term of this patent is extended or adjusted under 35 U.S.C. 154(b) by 2 days.

(21) Appl. No.: 14/156,069

(22) Filed: Jan. 15, 2014

(51) Int. Cl.
| | |
|---|---|
| *B60W 20/00* | (2006.01) |
| *B60L 11/12* | (2006.01) |
| *B60L 11/18* | (2006.01) |
| *B60W 10/06* | (2006.01) |
| *B60W 10/08* | (2006.01) |
| *B60W 10/26* | (2006.01) |

(52) U.S. Cl.
CPC ............. *B60L 11/12* (2013.01); *B60L 11/1861* (2013.01); *B60L 11/1816* (2013.01); *B60W 20/106* (2013.01); *B60W 10/06* (2013.01); *B60W 10/08* (2013.01); *B60W 10/26* (2013.01); *Y10S 903/93* (2013.01)

(58) Field of Classification Search
CPC . B60L 11/12; B60L 11/1861; B60L 11/1816; B60W 20/106; B60W 10/06; B60W 10/08; B60W 10/26; Y10S 903/93
USPC .......................................................... 701/22
See application file for complete search history.

(56) References Cited

U.S. PATENT DOCUMENTS

| | | | |
|---|---|---|---|
| 5,385,211 A | 1/1995 | Carroll | |
| 5,821,706 A | 10/1998 | Koga | |
| 6,837,215 B2 | 1/2005 | Nishigaki et al. | |
| 7,044,255 B2 | 5/2006 | Maeda et al. | |
| 7,906,935 B2 | 3/2011 | Kissel | |
| 2008/0000700 A1 | 1/2008 | Kotani et al. | |
| 2010/0025131 A1* | 2/2010 | Gloceri et al. ............. | 180/65.28 |
| 2012/0312122 A1* | 12/2012 | Miller et al. .................... | 74/664 |
| 2014/0025248 A1* | 1/2014 | Angrick et al. ................. | 701/22 |

FOREIGN PATENT DOCUMENTS

| | | |
|---|---|---|
| FR | 2599678 | 12/1987 |
| FR | 2758773 | 7/1998 |
| GB | 2420765 | 6/2006 |
| JP | 02112629 | 4/1990 |
| JP | 2000013909 | 1/2000 |
| JP | 2009262894 | 11/2009 |
| WO | 2010/020020 | 2/2010 |

\* cited by examiner

*Primary Examiner* — Richard Camby
(74) *Attorney, Agent, or Firm* — Kyle S. Brant (57) ABSTRACT

A computer controlled electric vehicle is disclosed that includes two high power batteries, a motor drive circuit, an electric motor that drives the vehicle drive train, a generator, an internal combustion engine, and battery charging circuitry. The batteries are connected to the motor drive circuit in a mutually exclusive fashion where only one battery is online or connected at any given time and the other battery is offline. The offline battery is recharged by battery charging circuitry that receives its power from a generator that is mechanically driven by an onboard hydrocarbon engine. When the online battery is depleted, the computer disconnects the online battery from the motor drive circuit and connects the offline battery to the motor drive circuit. The depleted battery is then charged in readiness for the next battery switch event. An external power plug enables recharging of the batteries when external power is available.

14 Claims, 5 Drawing Sheets

ELECTRIC VEHICLE HAVING A DUAL BATTERY SYSTEM

FIELD OF THE INVENTION

This invention relates to motorized vehicles and more particularly to electric vehicles and hybrid vehicles.

BACKGROUND OF THE INVENTION

Electric vehicles are well known in the prior art. Two common variations on such vehicles include purely electric vehicles having a rechargeable battery and an electric motor for driving the wheels, and hybrid vehicles including a combination of electric motor and internal combustion engine drive capability for delivering power to the wheels of the vehicle.

A distinct disadvantage associated with purely electric vehicles is the need to recharge the battery when the battery has been discharged as a result of vehicle use or due to an extended idle time span during which the vehicle battery was not charged. Battery technology has advanced in recent years with the advent of rapid charging battery chemistries, yet the time required for battery charging is still significant.

Further advances in battery technologies should result in smaller batteries with higher charge capacities directly affecting the physical space required for the battery compartment in an electric vehicle. Smaller battery space requirements and, more importantly, faster battery charging cycle times will ultimately benefit the electric vehicle industry yet further advances to take advantage of such battery improvements are needed, specifically an electric vehicle whose design fully contemplates these advances in technology.

SUMMARY OF THE INVENTION

An electric vehicle according to one aspect of the present invention comprises a passenger vehicle having four wheels, an electric motor having an output shaft mechanically coupled to and driving at least one of the four wheels, an accelerator transducer that produces a speed control signal in accordance with mechanical input from an operator of the vehicle, motor drive circuit means for producing a motor drive signal in accordance with the speed control signal, the motor drive circuit means including a motor power input for connection to a source of electrical power to produce the motor drive signal, and wherein the motor drive signal is supplied to the electric motor, a first battery, a second battery, an electric power generator having an input shaft, an internal combustion engine having an output shaft coupled to the input shaft of the electric power generator and wherein the internal combustion engine is optimized for efficiency to operate the electric power generator at a predetermined generator speed, charging circuit means for producing a charging signal, the charging circuit means receiving a power signal from the electric power generator; and, switch means for connecting the first battery and the second battery to the motor drive circuit means and the charging signal, the switch means operating in a first mode of operation to connect the first battery to the motor power input of the motor drive circuit means and connecting the second battery to the charging signal, the switch means operating in a second mode of operation to connect the second battery to the motor power input of the drive circuit means and connecting the first battery to the charging signal, and wherein the switch means operates in the first mode of operation while the charge state of the first battery is above a predetermined charge level and the switch means operates in the second mode of operation while the charge state of the second battery is above the predetermined charge level.

One object of the present invention is to provide an improved electric vehicle.

Another object of the present invention is to utilize two separate high output batteries to drive the electric motor of an electric vehicle.

Still another object of the present invention is to provide a charging mechanism for recharging a discharged battery while enabling continued operation of an electric vehicle.

These and other objects of the present invention will become more apparent from the following description of the preferred embodiments.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Figure 1:
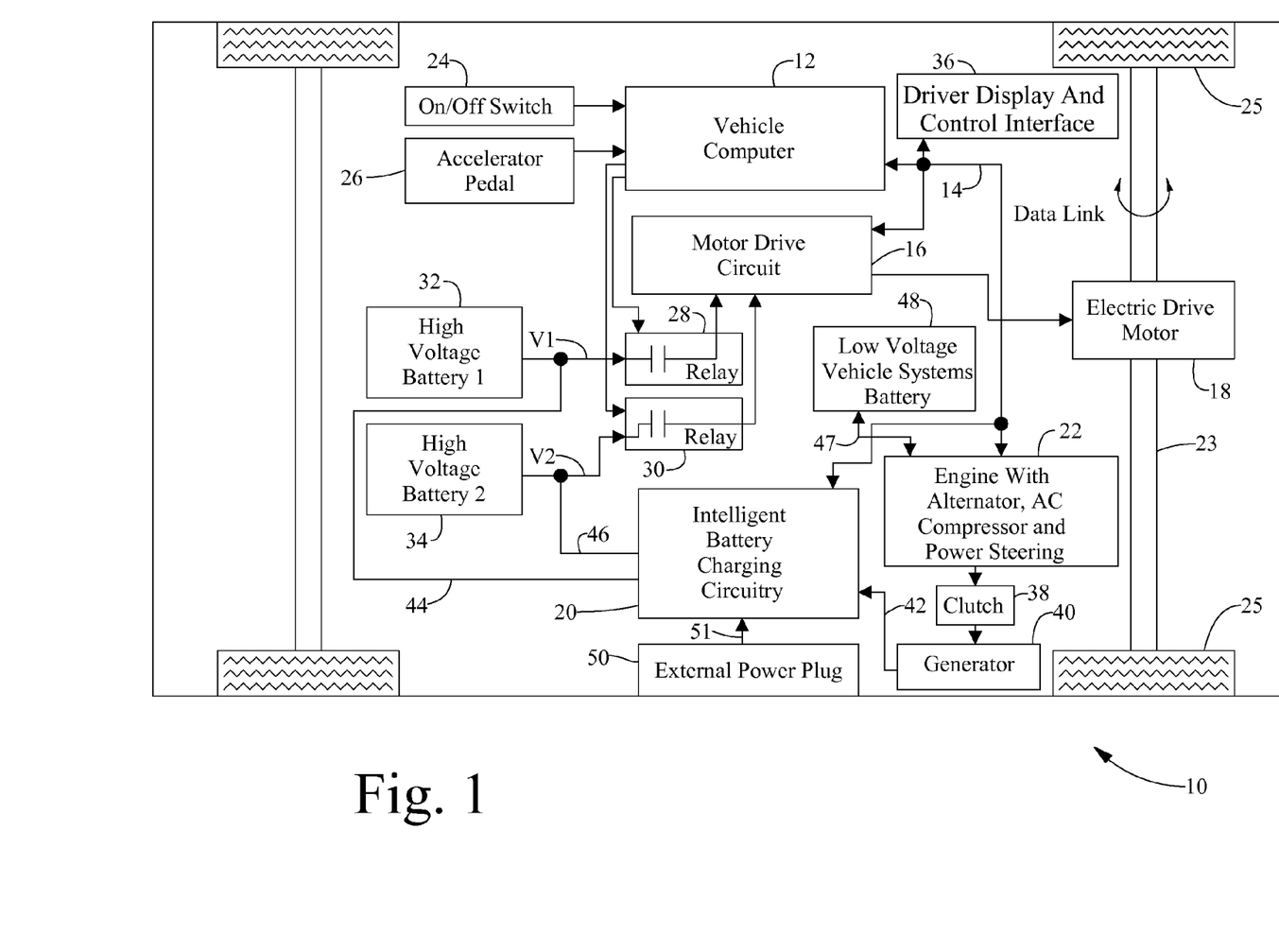
FIG. 1 is a diagrammatic illustration of an electric vehicle according to the present invention.

Referring now to FIG. 1, a diagrammatic illustration of an electric vehicle 10 according to the present invention is shown. Vehicle 10 includes vehicle computer 12 which manages a dual battery electric drive system and an on board battery charging and power generation system. Computer 12 monitors and controls the various system components shown to operate vehicle 10 in a power and fuel efficient fashion. Computer 12 includes a bi-directional data link 14 for receiving digital data from and issuing digital data commands to motor drive circuit 16, electric drive motor 18, battery charging circuitry 20 and internal combustion engine 22. The output shaft of drive motor 18 is mechanically coupled to vehicle axle 23 so that tires 25 rotate in accordance with the rotation of the output shaft of motor 18. Motor 18 is preferably a direct current motor.

Input devices connected to computer 12 include on/off switch 24 for enabling and disabling system operation and accelerator pedal 26 which produces a continuously variable analog signal corresponding to the position of the accelerator pedal, similar to throttle position sensors used with internal combustion engines of the prior art. Computer 12 directly controls the energized state of relays 28 and 30 and energizes, in a mutually exclusive manner, one of the relays 28 or 30 in accordance with algorithms discussed below to connect a high voltage signal from either battery 32 or battery 34 to motor drive circuit 16. Accelerator pedal 28 supplies a speed signal to computer 12 and in accordance with the speed signal computer 12 controls motor drive circuit 16 to produce a power signal supplied to drive motor 18. Alternatively, accelerator pedal 28 may be connected directly to motor drive circuit 16 and computer 12 would then receive pedal position data from motor drive circuit 16 and also enable and disable the output of drive circuit 16 for safety reasons.

System information is displayed by computer 12 via driver display and control interface 36. Interface 36 also provides a multitude of vehicle system control inputs for the vehicle operator to enter commands for computer 12 to respond to, such as heating and air conditioning controls, vehicle lighting controls, wiper controls, radio and navigation electronics and other accessories typically found on motorized vehicles. System information displayed by computer 12 on display interface 36 includes, but is not limited to, current vehicle operation parameters such as vehicle speed, battery charge/health state for batteries 32 and 34, battery currently connected to motor drive circuit 16, estimated battery life based on current load factors, and estimated time to recharge off line battery.

Computer 12 provides closed loop control over the operating parameters of engine 22 to achieve superior efficiency of operation. Alternatively, engine 22 may include a separate computer based engine controller that communicates with computer 12 over data link 14 to receive operational commands and provide operational data to computer 12. It is contemplated that all necessary electronic input sensors and output control devices well known in the internal combustion engine art are monitored or controlled by computer 12 via data link 14. In addition, computer 12 controls the engaged or disengaged state of clutch 38. Clutch 38 mechanically connects the output shaft of engine 22 to the input shaft of generator 40 when clutch 38 is engaged or actuated. Engine 22 includes an air conditioning compressor for passenger compartment cooling and a power steering pump to provide a power assist to vehicle steering gear. The air conditioning compressor and power steering pump are optional items as it is contemplated such accessory devices may be eliminated to improve overall system efficiency and vehicle mileage capability. Engine 22 also includes an alternator for producing a low voltage charging signal supplied to vehicle systems battery 48 on signal path 47 and for providing electrical power to sensors and electrical devices requisite for operation of an internal combustion engine.

Generator 40 produces a power output signal 42 that is supplied to battery charging circuit 20. Battery charging circuit 20 produces independent and sophisticated battery charge signals on signal paths 44 and 46 in accordance with commands from computer 12. High power rechargeable batteries, such as lithium-ion cells, require sophisticated charging signals with proper voltage and current levels applied to the battery during the charging cycle to achieve a fully charged battery in a minimum amount of time. Computer 12 monitors and controls charging circuit 20 to achieve the most efficient and expedient battery charging cycles in accordance with well known battery chemistry prior art.

External power plug 50 provides an external electrical connection to vehicle 10 so that electrical power from an electric power grid or source of electrical power may be supplied to charging circuit 20, thereby enabling offline charging of batteries 32 and 34 when vehicle 10 is not mobile and placed in an "off" or "standby" state by the operator. When connected to external power, charging circuit 20 signals computer 12 to disable electric drive motor 18 thereby preventing movement and corresponding damage to vehicle 10 when a power cable is currently attached to power plug 50. Alternatively, a simple limit switch mounted on power plug 50 and actuated when a power cable is connected to plug 50 could signal computer 12 to disable drive motor 18 and prevent vehicle movement.

Operationally speaking, drive motor 18 will operate from one of the two batteries 32 or 34 during normal operation, that is, either relay 28 or relay 30 is energized in a mutually exclusive manner by computer 12 to provide a power signal to motor drive circuit 16 and subsequently enable power to motor 18 in accordance with vehicular speed and acceleration desired by the user. User desired speed and acceleration are determined by computer 12 from the position of accelerator pedal 26 factoring in current vehicle speed and acceleration. Internal combustion engine 22 operates in one of two distinct modes of operation, a first low power or idle mode where clutch 38 is disengaged by computer 12 and engine 22 runs at a slower or idle speed sufficient to provide power to accessory devices such as the air conditioning compressor and the power steering pump, and a second or high power mode of operation where clutch 38 is engaged and engine 22 operates at a higher speed driving generator 40 in addition to accessory devices. In the high power mode of operation, engine 22 will run at a speed designed for optimal efficiency of engine 22 given the various design parameters and desired output shaft speed for engine 22. Gasoline, propane, natural gas, hydrogen or diesel based internal combustion engines may be implemented for engine 22, diesel fuel being perhaps the more economical option at the present time. A similar design consideration is implemented for generator 40 in that generator 40 is optimized to run at the optimal efficiency speed of engine 22, thereby maximizing efficiency in the generation of power while conserving fuel usage by internal combustion engine 22.

The use of a variable resistor is contemplated as the source of the signal supplied to computer 12 by accelerator 26. Relays 32 and 34 are mutually exclusive in operation, that is, only one of the two relays is energized at any moment in time to isolate the output of both high power batteries from each other. Mutually exclusive operation can be achieved by the use of two relays as shown, by using a double-pole-double-throw relay or by electronic circuits that prevent relay 32 and relay 34 from being simultaneously energized. Another mechanism also contemplated is a relay having two sets of contacts, one normally open and one normally closed, with break before make operation useful to switch the two battery outputs to the motor drive circuit 16. Considerations for safety of operation in the software executed by computer 12 will serve to minimize the risk of fire in the event of a system component failure or as a result of a moving vehicle accident that causes damage to system components.

During normal operation of vehicle 10, the active or "online" battery, i.e., the battery (either battery 32 or 34) that is currently electrically connected to drive circuit 16 via either relay 28 or 30, will discharge as power is consumed by drive motor 18. For example, assume computer 12 has energized relay 28 and battery 32 is currently electrically connected to drive circuit 16. When the output of battery 32 falls below a predetermined voltage thereby indicating battery 32 is in need of recharging, computer 12 will de-energize relay 28 and energize relay 30 to disconnect battery 32 and connect battery 34 to drive circuit 16 to maintain a power input signal to drive circuit 16. Computer 12 will then command battery charging circuit 20 to supply a battery charging signal to battery 32. When the charge state of battery 34 has diminished to a level indicating recharging is required, battery 34 is taken offline by de-energizing relay 30 and battery 32 is brought online by energizing relay 28. If both batteries 32 and 34 are in a low state of charge, computer 12 will inform the operator via driver display 36 of the state of the batteries and estimate a driving distance that the vehicle may traverse before all battery power has been drained. Computer 12 will, in this manner, prevent a driver from being stranded without vehicular locomotion. Alternatively, generator 40 may be designed to provide a "limp home" power output capability to drive circuit 16 to supply drive motor 18 with sufficient power to operate vehicle 10 at a low rate of speed. The "limp home" mode is achieved by computer 12 by energizing relay 28 while simultaneously commanding charging circuit 20 to output a signal on signal path 44 sufficient for drive circuit 16 to actuate drive motor 18 at a low rate of speed.

Solid state switching devices well known in the electronic arts may be substituted for relays 28 and 32, though high quality relay contacts are typically considered to be preferred high power switching devices as they have negligible power loss across high quality relay contacts.

It is also contemplated that engine 22 may include a low power alternator or similar charging device for generating electrical power necessary for normal operation of engine 22 and charging battery 48. Another alternative design approach includes removing clutch 38 to establish a mechanical direct drive between generator 40 and engine 22 and utilizing a field current circuit supplied to generator 40 to vary the mechanical load and corresponding output of generator 40. Other enhancements contemplated include deriving a charging signal from motor 18 during vehicle deceleration or coasting and using the derived charging signal to return some charge to the vehicle batteries.

Figure 2:
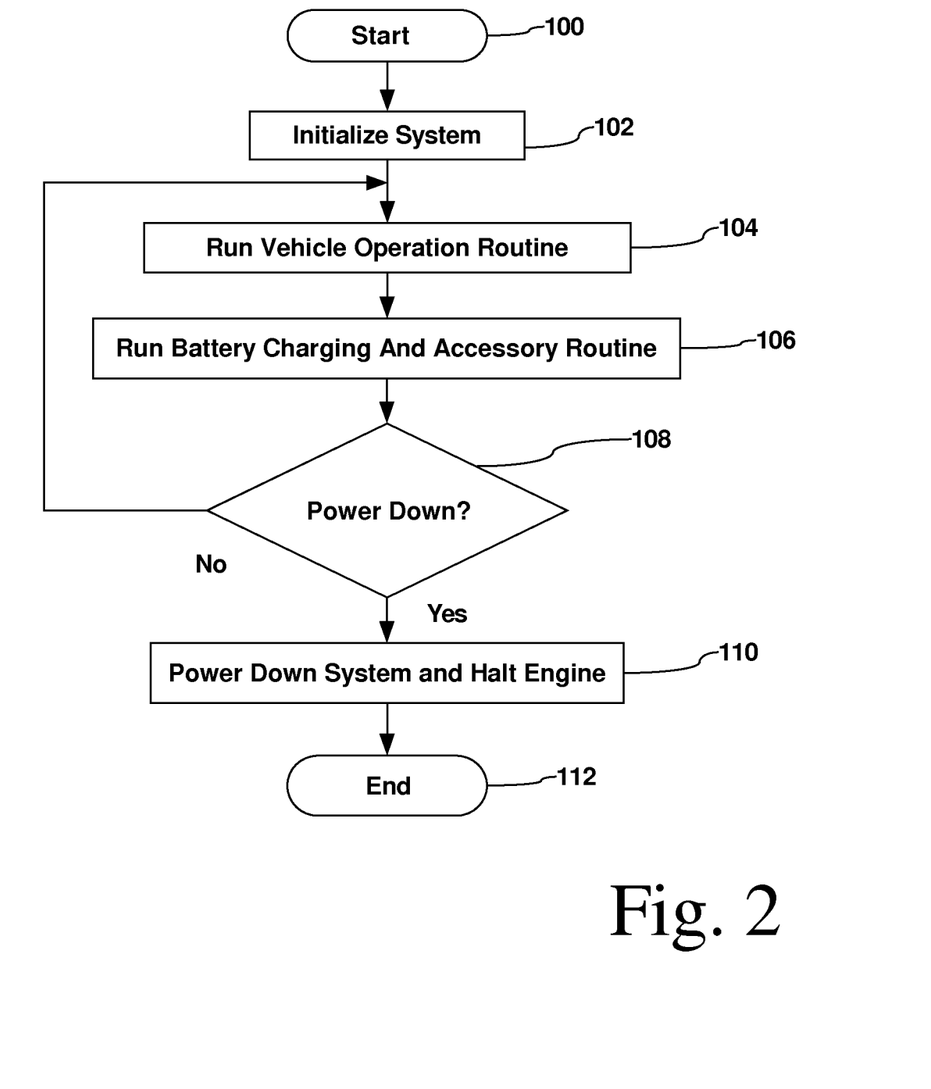
FIG. 2 is a flowchart for the computer program executed by computer 12 for the electric vehicle 10.

Referring now to FIG. 2, a flowchart for the computer program executed by vehicle computer 12 is shown. The computer program executed by computer 12 begins at step 100 when switch 24 is turned on by the operator of vehicle 10. Execution continues with step 102 wherein system initialization take place. Initialization steps include disabling relays 28 and 30, updating driver display 36 with driver vehicle operational information, setting motor drive circuit 16 to a startup control state so that no power is delivered to motor 18, and initializing battery charging circuitry 20 to a known state. Other initialization steps include diagnostic testing of data link 14 for proper communications with all of the devices connected thereto, including engine 22, drive circuit 16, charging circuitry 20 and driver display 36. Next at step 104 computer 12 begins execution of the vehicle operation routine program which is a looping program set forth in more detail in FIG. 3. Next at step 106 computer 12 runs the battery charging and accessory routine or program, described in more detail in the embodiments shown in FIGS. 4 and 5. Following step 106, computer 12 checks for power down input from switch 24. If power has been turned off by the user, program execution continues at step 110 where a power down sequence is initiated and engine 22 is stopped. After step 110, program execution ends at step 112. If at step 108 the position of on/off switch 24 is still in the on or run position, program execution returns to step 104.

Figure 3:
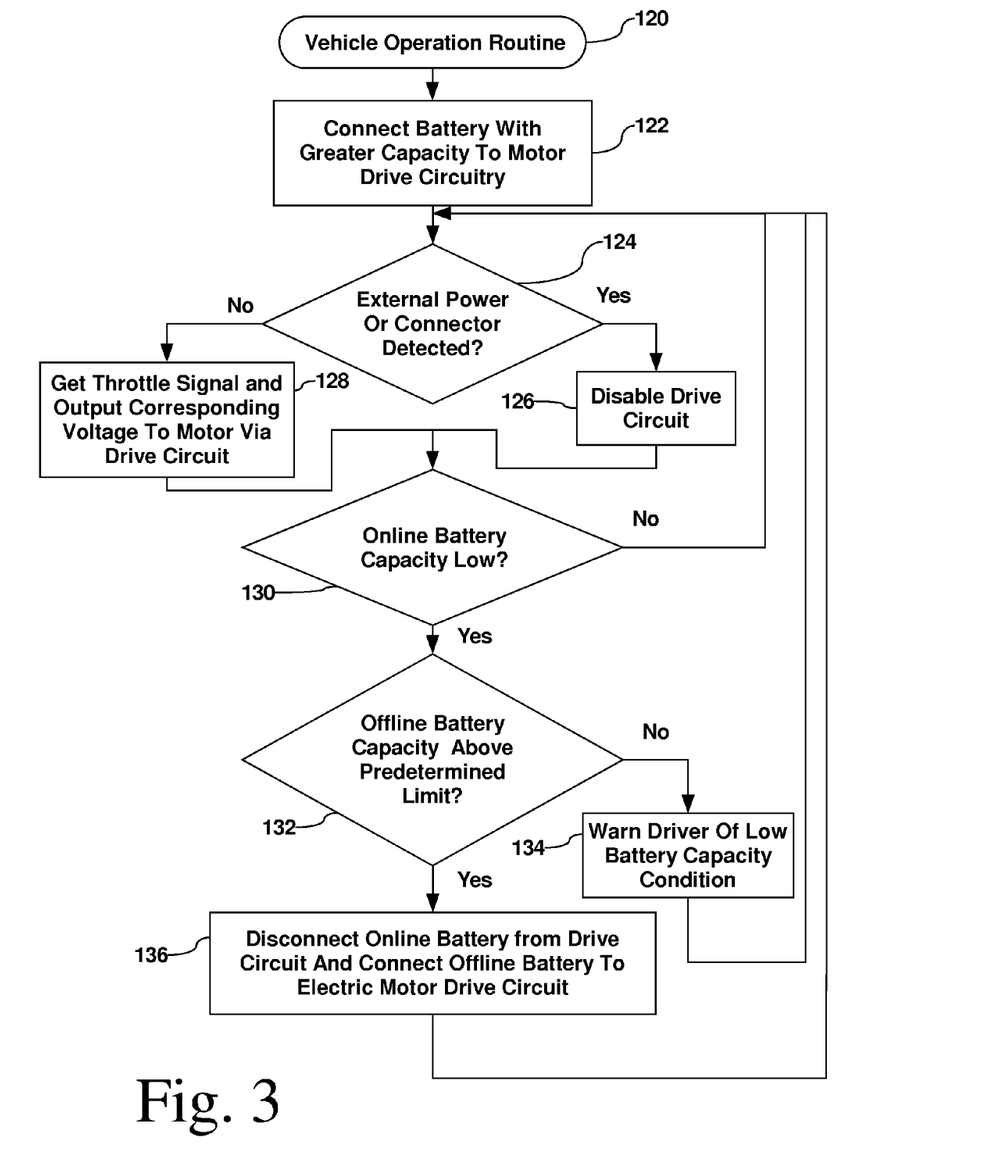
FIG. 3 is a flowchart for the Run Vehicle Operation Routine step 106 of FIG. 2.

Referring now to FIG. 3, the vehicle operation routine of step 104 in FIG. 2 is shown in more detail. The vehicle operation routine begins at step 120. Following step 120 at step 122, computer 12 actuates one of the relays 28 and 30 (normally open contact relays) so that high voltage battery power from one of the batteries 32 or 34 is connected to motor drive circuit 16. The decision as to which relay 28 or 30 is actuated at step 122 is based upon the charge state of the batteries. The charge state of batteries 32 and 34 is measured or monitored by charging circuit 20 and corresponding battery charge data is supplied to computer 12 via data link 14. Thus, if battery 32 has a higher charge state, computer 12 energizes relay 28 to connect battery 32 to drive circuit 16, and battery 32 is now the "online" battery while battery 34 becomes the "offline" battery. Next at step 124 computer 12 tests whether an external power cable has been connected to plug 50. Detection of a power cable connected to plug 50 is accomplished via battery charging circuitry 20 notifying computer 12 via data link 14 of an external power signal detected on signal path 51. If external power is detected program execution continues at step 126 wherein motor drive circuit 16 is disabled so that drive motor 18 does not operate and preventing movement of vehicle 10 when external power is connected. If at step 124 external power is not detected, then program execution continues at step 128 wherein computer 12 monitors the signal from accelerator pedal 26 and commands motor drive 16 to output a voltage to drive motor 18 in accordance with the position of pedal 26 and current vehicle speed. Following steps 128 and 126, program execution continues at step 130. At step 130 computer 12 obtains the online battery charge state or charge capacity from charging circuitry 20 and if the charge state is not below a predetermined value program execution returns to step 124. If at step 130 the online battery charge state is below a predetermined limit program execution continues at step 132. At step 132 computer 12 obtains the offline battery charge state from charging circuitry 20 to ensure it is ready for use. If the offline battery charge state is below a predetermined charge state execution continues at step 132 and a warning message is displayed on drive display 36 to inform the operator that both batteries have a charge state below a predetermined limit informing the driver that a fixed amount of charge remains and vehicle operation is distance limited. If at step 132 the offline battery tests above the low charge limit, then program execution continues at step 136 wherein computer 12 disconnects the online battery from drive circuit 16 by disabling the corresponding relay (28 or 30) and connects the offline battery to motor drive circuit 16 by energizing the corresponding relay (28 or 30) to connect the higher charge state battery to drive circuit 16. For example, if relay 28 is currently energized at step 132, and battery 32 has low capacity (as determined at step 130) while battery 34 has an adequate charge state above a predetermined value, then computer 12 will de-energize relay 28 and energize relay 30 at step 136 to take battery 32 offline and make battery 34 the online battery by energizing relay 30 to connect battery 34 to drive circuit 16. It should be readily understood that the decision making process of computer 12 in switching batteries online and offline is based on battery charge state with the objective being to switch the batteries between online and offline states when charge state is low for the online battery and charge state is much higher for the offline battery. Following step 136, program execution continues at step 124 wherein computer 12 continues in this loop to monitor accelerator pedal 26 signals and command drive circuit 16 to output power to drive motor 18 in accordance therewith. Battery charge capacity predetermined limit values are selected to prevent undesirable rapid switching between online and offline batteries, for example, time delays and hysteresis are implemented.

Figure 4:
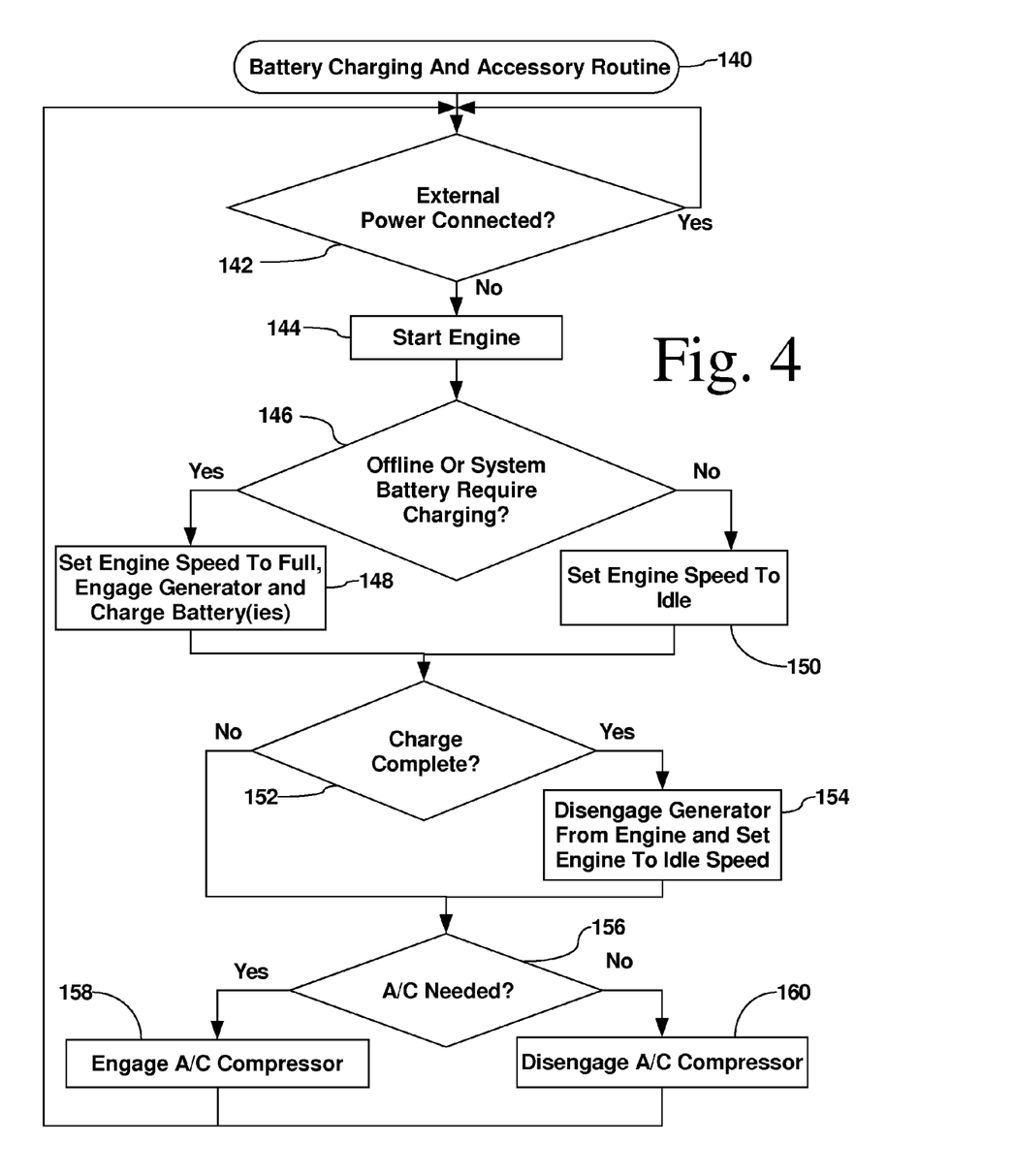
FIG. 4 is a flowchart for the Run Battery And Accessory Routine step 108 of FIG. 2.
Figure 5:
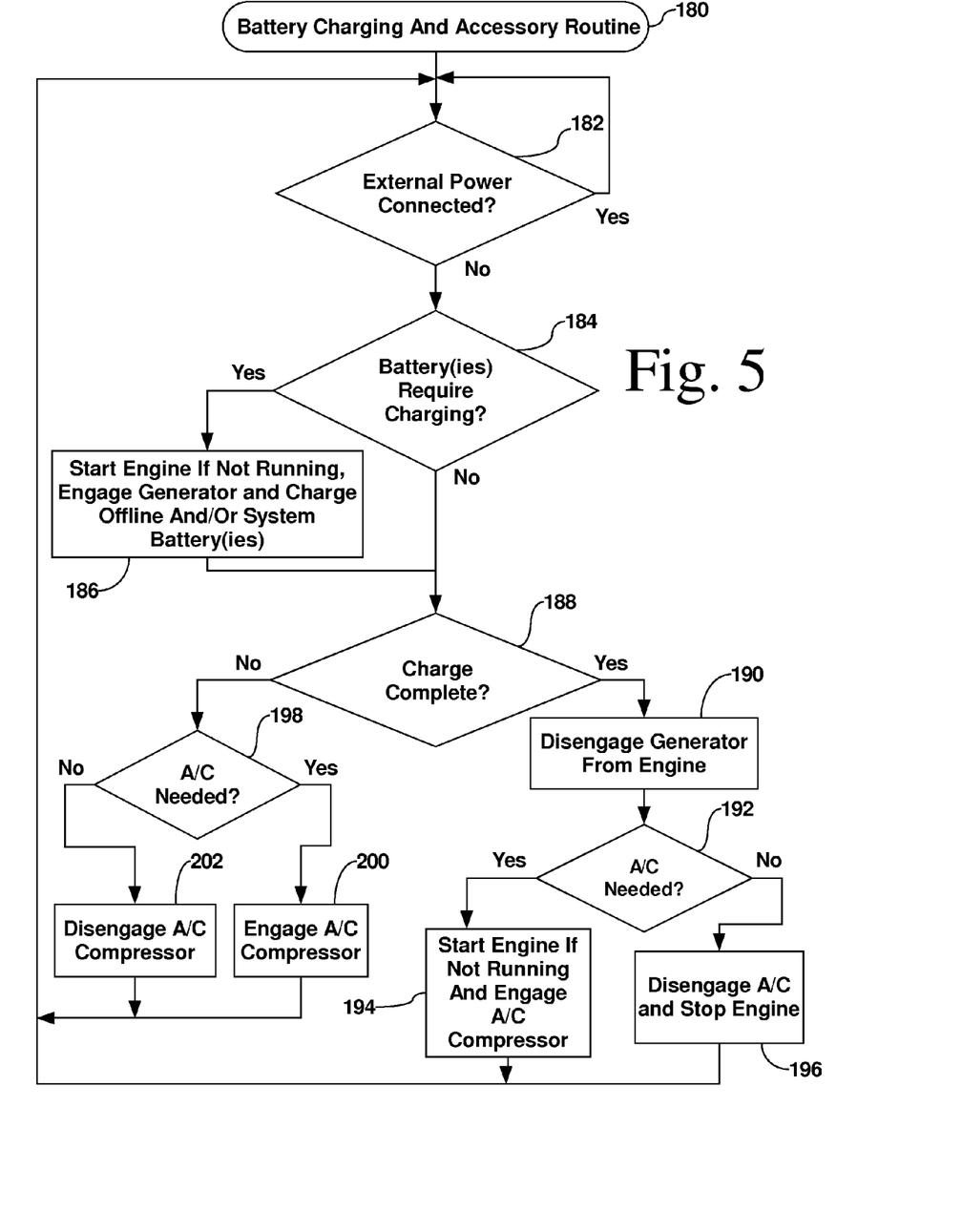
FIG. 5 is flowchart for an alternate embodiment of the Run Battery And Accessory Routine step 108 of FIG. 2.

Referring now to FIG. 4, a more detailed flowchart of the battery charging and accessory routine of step 106 in FIG. 2 is shown. The routine shown in FIG. 4 is one embodiment for step 106 and FIG. 5 is another embodiment for step 106. At step 142, following step 140, computer 12 queries charging circuit 20 regarding external power signal presence, and if an external power signal is detected, program execution loops on step 142 until external power is disconnected to prevent vehicle damage or damage to external power plug 50 if the vehicle moves. If external power is not detected at step 142, execution continues at step 144 wherein computer 12 commands engine 22 to start. Next at step 146, computer 12 queries battery charging circuitry 20 as to whether the offline battery requires charging. If the offline battery requires charging then step 148 is next executed and engine 22 is commanded to operate at a fully operational speed optimized for fuel usage and engage generator 40 by enabling clutch 38 to provide a power signal at path 42 to charging circuitry 20 used to charge batteries 32 and/or 34. Computer 12 instructs charging circuitry 20 to charge the offline battery by supplying a charging signal to either signal path 44 or 46, depending upon which battery is in the offline state. For example, if battery 32 is offline, charging circuitry 20 provides a charging signal at signal path 44 and if battery 34 is offline, a battery charging signal is provided at signal path 46 in accordance with commands from computer 12 via data link 14. Following step 148 execution continues at step 152. If at step 146 computer 12 determines the offline battery does not require charging, then program flow continues at step 150 wherein computer 12 commands engine 22 to run at a predetermined idle speed. Following step 150, execution continues at step 152. At step 152, computer 12 queries charging circuitry 20 to determine whether offline battery charging is completed. If charging is completed at step 152, execution continues at step 154 wherein computer 12 commands engine 22 to disengage generator 40 by disabling clutch 38, and set the speed of engine 22 to an idle speed so that alternator power is maintained to provide low level electrical power to vehicle 10 components and charge vehicle systems battery 48. Program execution continues at step 156 following step 154. If at step 152 the offline battery is determined to require further charging, then program execution continues at step 156 where computer 12 receives vehicle heating and air conditioning inputs via driver display and control interface 36. If passenger compartment cooling is desired by the vehicle operator, computer 12 commands engine 22 to engage the A/C compressor at step 158. If at step 156 A/C is not requested by the operator via computer 12, computer 12 commands engine 22 to disable the A/C compressor at step 160. Following steps 158 and 160 execution loops back to step 142.

Referring now to FIG. 5, another embodiment of the battery charging and accessory routine of step 106 in FIG. 2, according to the present invention, is shown. The routine begins at step 180 and continues at step 182 where computer 12 tests to determine if external power is connected at power plug 50. If external power is detected, execution loops back on step 182 preventing any further execution of this routine. If at step 182 external power is not detected, program execution continues at step 184 where computer 12 obtains offline battery charge state data from battery charging circuitry 20 and system battery 48 charge state data from engine 22 if either requires charging execution continues with step 186. At step 186 engine 22 is started by computer 12 and clutch 38 is engaged to provide mechanical rotational power to generator 40. If battery charging is not required at step 184, i.e., both the offline battery and system battery 48 are above predetermined charge capacity limits, then step 188 is executed following step 184. Next at step 188, computer 12 obtains charge state data for the offline battery from charging circuitry 20 and the charge state of system battery 48 from engine 22 and if both batteries are sufficiently charged above a predetermined full charge capacity, program execution continues at step 190 wherein computer 12 disables generator 40 by disengaging clutch 38 via commands to engine 22. Following step 190, execution continues at step 192 where computer 12 checks for the operational state of the climate control system of the vehicle 10 and if the operator has requested cooling of the passenger compartment then program execution continues at step 194 where computer 12 will start engine 22, if it is not already running, and instruct engine 22 to engage the A/C compressor to provide cooling of the passenger compartment. If A/C compressor operation has not been requested at step 192, then program flow proceeds to step 196 where computer 12 commands engine 22 to disengage the A/C compressor and halt engine 22 from operating. By halting operation of engine 22 for periods of time, a higher efficiency of operation is achieved. Following steps 194 and 196 program execution continues at step 182.

If at step 188 computer 12 determines that the offline battery has not been fully charged or the system battery 48 is not fully charged then program execution continues at step 198. If A/C cooling is needed at step 198 computer 12 will continue at step 200 and engage the A/C compressor if the operator has requested cooling of the passenger compartment. If the A/C compressor is not required at step 198, then step 202 is executed and the A/C compressor is disengaged via a command request sent to engine 22 from computer 12. Following steps 200 and 202, program execute returns back to step 182.

The primary difference between the routines shown in FIGS. 4 and 5 is the periodic halting of engine 22 in the FIG. 5 embodiment when the offline battery and system battery are sufficiently charged. Halting engine 22 provides an added level of efficiency wherein hydrocarbon fuels used to power engine 22 are conserved. The embodiment of FIG. 5 preferably includes a vehicle that does not require a power steering assist pump, or alternatively, a power steering assist device that is electrically powered is contemplated. It should be recognized that not every vehicle requires power steering, particularly smaller vehicles, thus the embodiment of FIG. 5 is contemplated as desirable for its additional energy savings.

While the invention has been illustrated and described in detail in the drawings and foregoing description of the preferred embodiments, the same is to be considered as illustrative and not restrictive in character, it being understood that only the preferred embodiments have been shown and described and that all changes and modifications that come within the spirit of the invention are desired to be protected.

What is claimed is:

1. An electric vehicle comprising:
   a passenger vehicle having four wheels;
   an electric motor mechanically coupled to and driving at least one of said four wheels, said electric motor having a motor input for connection to a source of power;
   motor drive circuit means having a drive input, a drive output and a drive control input, and wherein said motor drive circuit means produces a variable power signal at said drive output in accordance with a control signal supplied to said drive control input, and further wherein said drive output is electrically connected to said motor input;
   a first battery having a first battery output;
   a second battery having a second battery output;
   a battery charging circuit having a control input, a power input, a first charge output and a second charge output, said battery charging circuit responding to control signals applied at said control input to independently produce battery charging signals at said first charge output and said second charge output when a power signal is supplied to said power input, and wherein said first charge output is connected to said first battery output and said second charge output is connected to said second battery output;

switch means for connecting said first battery output and said second battery output in a mutually exclusive manner to the drive input of said motor drive circuit means, said switch means having a first mode of operation wherein said first battery output is connected to the drive input of said motor drive circuit means and a second mode of operation wherein said second battery output is connected to the drive input of said motor drive circuit means;

a generator having a generator shaft and an electrical power output, said generator producing an electrical power signal at said generator output in response to rotation of said generator shaft, and wherein said generator output is connected to the power input of said battery charging circuit, and wherein said generator is optimized to operate most efficiently to produce power at a predetermined optimal generator speed;

an internal combustion engine having an output shaft rotatably attached to said generator shaft, said internal combustion engine being optimized to run at said predetermined optimal generator speed;

accelerator pedal means responsive to operator deflection thereof to produce an accelerator signal;

computer means including program memory, random access memory, inputs and outputs, said computer means performing the following steps:

a) activating said switch means into said first mode of operation;

b) providing a speed signal to the drive input of said motor drive circuit in accordance with said accelerator signal;

c) monitoring the signal at said first battery output and activating said switch means into said second mode of operation when the voltage at said first battery output falls below a predetermined value;

d) starting said internal combustion engine;

e) providing a control signal to the control input of said battery charging circuit that induces said battery charging circuit to produce a battery charging signal at said first charge output until said first battery is charged and simultaneously removing any battery charging signal at said second charge output;

f) monitoring the signal at said second battery output and activating said switch means into said first mode of operation when the voltage at said second battery output falls below a predetermined value;

g) providing a control signal to the control input of said battery charging circuit that induces said battery charging circuit to produce a battery charging signal at said second charge output until said second battery is charged and simultaneously removing any battery charging signal at said first charge output; and h) repeating steps a-g indefinitely.

2. The electric vehicle of claim 1 further including:

an external power connector for connecting said power input of said battery charging circuit to a source of external electrical power; and wherein said computer means performs the additional step of supplying a zero speed signal to the drive input of said motor drive circuit when an external source of power is connected to said external power connector thereby preventing vehicle operation.

3. The electric vehicle of claim 2 wherein said computer means further performs the step of turning off said internal combustion engine when said first battery output and said second battery output are both above said predetermined value.

4. The electric vehicle of claim 3 wherein said internal combustion engine includes a power steering pump for power assist steering of said vehicle, an air conditioning compressor for A/C system cooling, and an alternator for providing a low power signal for vehicle electrical systems.

5. The electric vehicle of claim 1 wherein said computer means performs the additional repeating steps of:

operating said internal combustion engine at an idle speed when said first battery output and said second battery output are above said predetermined value;

operating said internal combustion engine at said predetermined optimal generator speed when said first battery output is below said predetermined value; and operating said internal combustion engine at said predetermined optimal generator speed when said second battery output is below said predetermined value.

6. An electric vehicle comprising:

a passenger vehicle having four wheels;

an electric motor mechanically connected to and driving at least one of said four wheels, said electric motor having a motor input for connection to a source of power;

motor drive circuit means having a drive input, a drive output and a drive control input, and wherein said motor drive circuit means produces a variable power signal at said drive output in accordance with a control signal supplied to said drive control input, and further wherein said drive output is electrically connected to said motor input;

a first battery having a first battery output;

a second battery having a second battery output;

a battery charging circuit having a control input, a power input, a first charge output and a second charge output, said battery charging circuit responding to control signals applied at said control input to independently produce battery charging signals at said first charge output and said second charge output when a power signal is supplied to said power input, and wherein said first charge output is connected to said first battery output and said second charge output is connected to said second battery output;

a first switch circuit responsive to a first switch input for connecting said first battery output to the drive input of said motor drive circuit;

a second switch circuit responsive to a second switch input for connecting said second battery output to the drive input of said motor drive circuit;

a generator having a generator shaft and an electrical power output, said generator producing an electrical power signal at said generator output in response to rotation of said generator shaft, and wherein said generator output is connected to the power input of said battery charging circuit, and wherein said generator is optimized to operate most efficiently to produce power at a predetermined optimal generator speed;

an internal combustion engine having an output shaft rotatably attached to said generator shaft, said internal combustion engine being optimized to run at said predetermined optimal generator speed;

accelerator pedal means responsive to operator deflection thereof to produce an accelerator signal;

computer means including program memory, random access memory, inputs and outputs, said computer means performing the following steps:

a) supplying an activation signal to the first switch input of said first switch circuit to connect said first battery output to said drive motor input;

b) providing a speed signal to the drive input of said motor drive circuit in accordance with said accelerator signal;
c) monitoring the signal at said first battery output and removing the signal from said first switch input when the voltage at said first battery output falls below a predetermined value;
d) supplying an activation signal to the second switch input of said second switch circuit to connect said second battery output to said drive motor input;
e) starting said internal combustion engine;
f) providing a control signal to the control input of said battery charging circuit that induces said battery charging circuit to produce a battery charging signal at said first charge output until said first battery is charged and simultaneously removing any battery charging signal at said second charge output;
g) monitoring the signal at said second battery output and removing the signal from said second switch input when the voltage at said second battery output falls below a predetermined value;
h) providing a control signal to the control input of said battery charging circuit that induces said battery charging circuit to produce a battery charging signal at said second charge output until said second battery is charged and simultaneously removing any battery charging signal at said first charge output; and
i) repeating steps a-h indefinitely.

7. The electric vehicle of claim 6 wherein said computer means performs the additional repeating steps of:
operating said internal combustion engine at an idle speed when said first battery output and said second battery output are simultaneously above said predetermined value;
operating said internal combustion engine at said predetermined optimal generator speed when said first battery output is below said predetermined value; and
operating said internal combustion engine at said predetermined optimal generator speed when said second battery output is below said predetermined value.

8. The electric vehicle of claim 7 further including:
an external power connector for connecting said power input of said battery charging circuit to a source of external electrical power; and
wherein said computer means performs the additional repeating steps of:
a) detecting a source of external power connected to said external power connector and
b) supplying a zero speed signal to the drive input of said motor drive circuit means while said external source of electrical power is connected to said external power connector thereby preventing vehicle movement.

9. The electric vehicle of claim 8 wherein said internal combustion engine includes an alternator for supplying low voltage vehicle systems power, a power steering pump to provide power steering assist to vehicle steering and an air conditioning compressor for cooling of the vehicle interior.

10. An electric vehicle comprising:
a passenger vehicle having four wheels;
an electric motor having an output shaft mechanically coupled to and driving at least one of said four wheels;
an accelerator transducer that produces a speed control signal in accordance with mechanical input from an operator of the vehicle;
motor drive circuit means for producing a motor drive signal in accordance with said speed control signal, said motor drive circuit means including a motor power input for connection to a source of electrical power to produce said motor drive signal, and wherein said motor drive signal is supplied to said electric motor;
a first battery;
a second battery;
an electric power generator having an input shaft;
an internal combustion engine having an output shaft coupled to said input shaft of said electric power generator and wherein said internal combustion engine is optimized for efficiency to operate said electric power generator at a predetermined generator speed;
charging circuit means for producing a charging signal, said charging circuit means receiving a power signal from said electric power generator; and
switch means for connecting said first battery and said second battery to said motor drive circuit means and said charging signal, said switch means operating in a first mode of operation to connect said first battery to said motor power input of said motor drive circuit means and connecting said second battery to said charging signal, said switch means operating in a second mode of operation to connect said second battery to said motor power input of said drive circuit means and connecting said first battery to said charging signal, and wherein said switch means operates in said first mode of operation while the charge state of said first battery is above a predetermined charge level and said switch means operates in said second mode of operation while the charge state of said second battery is above said predetermined charge level.

11. The electric vehicle of claim 10 wherein said internal combustion engine includes an air conditioning compressor used to cool the interior of said vehicle and an alternator for generating a low voltage vehicle systems power signal.

12. The electric vehicle of claim 11 further including:
an external power connector for connecting said power input of said battery charging circuit to a source of external electrical power;
means for detecting a source of external power connected to said external power connector, said means for detecting producing a disable signal in response thereto; and
disable circuit means responsive to said disable signal for disabling said motor drive circuit when said disable signal is present.

13. The electric vehicle of claim 12 including:
engine speed control means for controlling the speed of said internal combustion engine, said engine speed control means setting the speed of said internal combustion engine to said predetermined generator speed, during typical operation, and wherein said engine control means sets the speed of said internal combustion engine to a reduced speed when the charge state of said first battery and the charge state of said second battery are simultaneously above said predetermined charge level.

14. The electric vehicle of claim 13 wherein said reduced speed is 0 RPM and wherein said engine speed control means restarts said internal combustion engine for typical operation thereof at said predetermined generator speed.

* * * * *